Nov. 27, 1928. 1,693,385
F. W. HOCHSTETTER ET AL
BATTERY
Filed Jan. 21, 1926 2 Sheets-Sheet 1
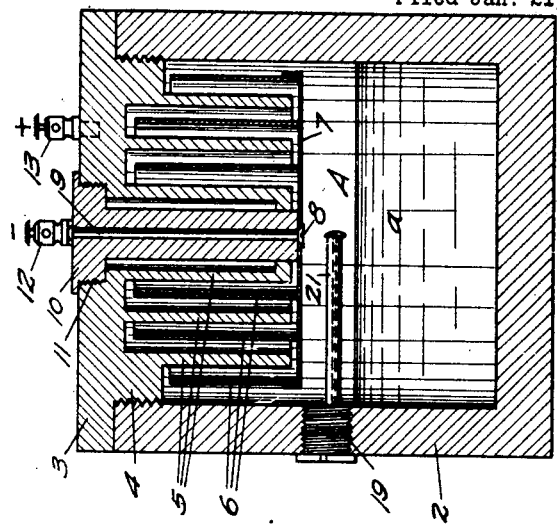
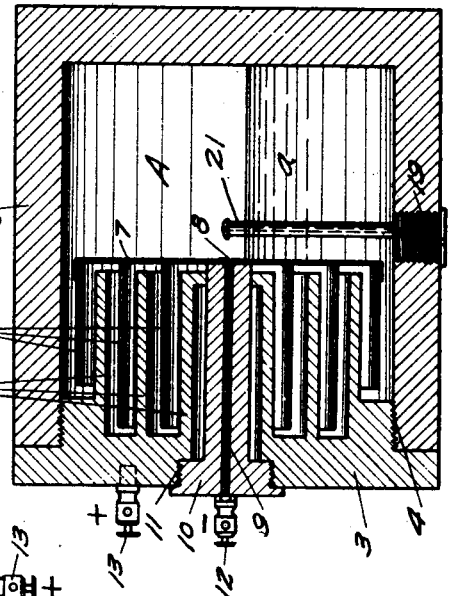
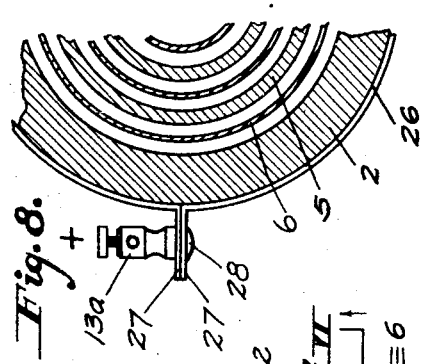
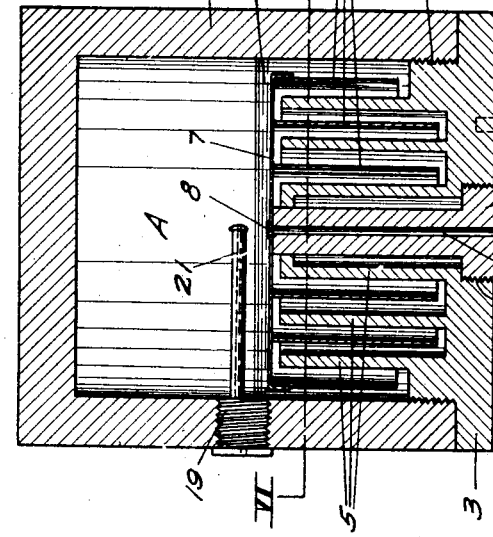
INVENTORS
Frederick W. Hochstetter
BY William H. Broad
ATTORNEY Nov. 27, 1928. 1,693,385
F. W. HOCHSTETTER ET AL
BATTERY
Filed Jan. 21, 1926 2 Sheets-Sheet 2
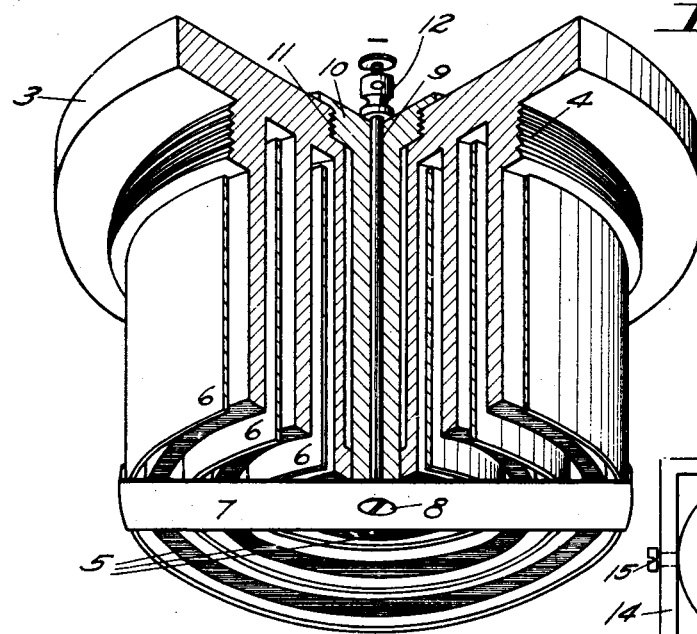
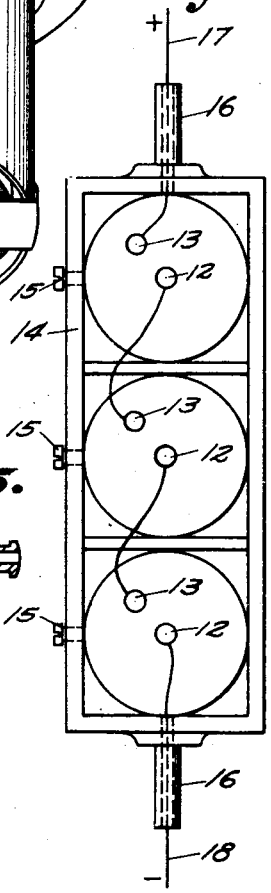
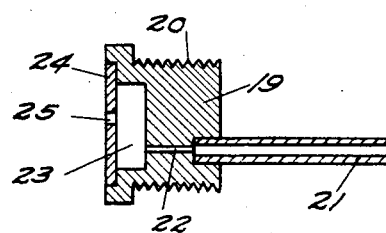
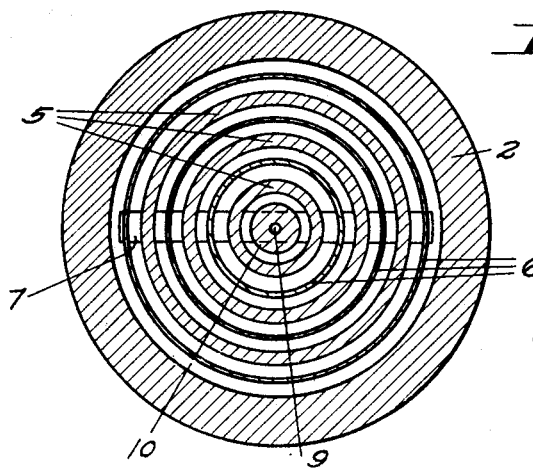
INVENTORS
Frederick W. Hochstetter
BY William W. Broad
C. M. Clarke
ATTORNEY Patented Nov. 27, 1928.

1,693,385

UNITED STATES PATENT OFFICE.

FREDERICK W. HOCHSTETTER, OF PITTSBURGH, AND WILLIAM BROAD, OF MARS, PENNSYLVANIA, ASSIGNORS, BY MESNE ASSIGNMENTS, TO SAID FREDERICK W. HOCHSTETTER.

BATTERY.

Application filed January 21, 1926. Serial No. 82,680.

Our invention consists of an improvement in batteries, and has for its object to provide a simple, convenient, and economical battery, capable of easy and accurate control of the output, and independent of rheostat control.

The battery, as a unit, is designed to be used singly or in multiple and to be bodily adjusted by rotation in a suitable holding frame or by any desirable trunnion support, whereby to adjust the battery to any desired extent to effect either partial or complete immersion of the anode and cathode elements in the electrolyte, for a variable current supply, or to effect a complete separation between said elements and the electrolyte.

This effect is secured by so constructing and mounting the active elements of the battery within an inclosing electrolyte containing case, together with means for carrying off produced gases or vapors without leakage in the manner more fully and hereinafter described.

In the drawings showing one preferred embodiment of the invention;

Fig. 1 is a view in vertical section showing the battery in position for generation of the full current supply, with the elements submerged.

Fig. 2 is a similar view, but in reverse position, showing the elements out of contact with the electrolyte.

Fig. 3 is a similar sectional view showing the elements partially submerged, all of said views showing the gas conduit in operative position.

Fig. 4 is a perspective view partly in section of the assembled series of the active elements of the battery.

Fig. 5 is a sectional detail view of the gas escape conduit and plug.

Fig. 6 is a cross section on the line VI—VI of Fig. 1.

Fig. 7 is a plan view showing a plurality of battery units mounted in a rotatable casing.

Fig. 8 is a partial sectional view, like Fig. 6, showing a modified construction.

Referring to the drawings, 2 is the main casing of carbon or suitable carbonaceous material or its equivalent constituting one active member of the battery, with its cap arranged for connection with the positive supply. 3 is a cap therefor, of carbon or its equivalent secured within the open end of member 2 by screw thread connections 4.

Together, members 2 and 3 provide a closed hollow chamber having the cavity A, the main body and cavity being preferably cylindrical in cross section. Cap 3 is provided with a series of concentric annular rings 5, constituting anode members, between which extend from their inner ends the intervening cathode members 6, of similar construction and arrangement.

Members 6 are preferably made of a series of zinc rings or zinc sleeves, or which may be of any equivalent suitable conducting metal, element or material, rigidly connected at one end by the zinc cross bar 7 as in Fig. 4. All of said members are connected in series by said bar, which is connected or supported at 8 with a stem 9 which extends centrally through the central carbon plug 10 which is screwed or otherwise fitted into the cap 3 as at 11.

Conductor stem 9 is provided with a terminal binding post 12 constituting the negative pole of the battery. Cap 3 is provided with a similar binding post 13 constituting the positive pole connected with the main carbon body portions.

As shown, the several carbon rings 5 are comparatively thin with sufficient intervening space for the zinc rings 6, their terminals and cross bar 7 being spaced away from the carbon walls so as to provide ample intervening circulation and contact space for the electrolyte fluid $a$.

As thus constructed, it will be seen that when the battery is inverted as in Fig. 1, all of the active members will be submerged with production of a full current and maximum voltage. When tilted or inverted in the opposite direction as in Fig. 2, all of the active members will be elevated out of such submergence and contact and action of the battery and resulting output is positively terminated.

During the period of rest, when thus inverted, the remaining solution adhering to the metal protects and thereby prolongs its life and retards oxidation of the metal.

When tilted to a horizontal position as in Fig. 3, or to varying intervening positions on an axial center transverse of the longitudinal center through the cylinder, there will be a partial submergence of the members, more or less, depending upon the degree of tilt. Any other suitable means adapted to effect tilting and a combination with one or a plurality of batteries may be substituted. It will also be obvious, that any such combination may be arranged either in series or multiple.

To effect such tilting and operation, the battery unit itself may be provided with suitable trunnion bearings on opposite sides of its cylindrical surface, or one or more battery units may be mounted within a holding case 14 as in Fig. 7 and secured by any suitable means, as by binding screws 15.

Case 14 is provided with terminal trunnion bearings 16—16 mounted in supports, whereby the case and contained battery unit or units may be rotated to the desired degree to effect the results above noted.

The leads 17, 18, may be introduced through the hollow trunnions 16 and are connected with the proper binding posts 13 and 12 of the units, at any suitable locations thereon. In the case of a plural unit installation, the batteries are connected in series as shown, or in multiple if preferred.

For the purpose of providing for the exhaust of any produced gases or vapors, one side of the shell of case 2 is provided with an inserted plug 19 secured by threads 20 and having an inwardly extended hollow stem 21 terminating at a point corresponding exactly or approximately to the middle center of the battery.

Hollow conduit 21 opens to the interior at such point and then communicates by port 22 through plug 19 with an outer chamber 23 of the plug covered by a disc 24 having an exhaust port 25 to the outside air.

By such construction, it will be seen that in any position which the battery unit may assume, there will be a free communication between the interior cavity A and the exterior for exhaust of any produced gases.

At the same time, the inner terminal or tube 21 is prevented from submergence or immersion in the electrolyte $a$ in any portion of the battery. Should however, there be any possibility of any electrolyte entering the tube 21, as by splashing or other disturbance it will be pocketed and collected in the remote chamber 23 from whence it may be returned to the battery by proper tipping manipulation.

While the carbon casing or its top may be provided with a suitable binding post 13 for circuit connection through the battery to the central stem binding post 12, binding post 13 may be arranged in any other suitable way. Thus in Fig. 8 we show a modified construction, utilizing a thin copper or other metallic band 26 surrounding the main casing 2 and tightly secured by terminal flanges 27 and a bolt or stud 28. Such band is of advantage in reinforcing the casing, while at the same time providing a convenient circuit connection by binding post $13^a$ secured by the stud or screw 28.

The general construction and operation of the device will be readily understood and appreciated from the foregoing description.

While the battery is particularly designed and adapted for use and application to radio receiving sets, it is not limited thereto, but may be used with any current utilizing mechanism within its limitations.

It constitutes in itself a current producing and controlling apparatus, avoiding the necessity of rheostats or other equivalent devices, and by avoiding contact between the active elements and the electrolyte, when current is not needed, effects a large saving in local action and retarding deterioration, and a resulting great increase in the life of the battery.

It may, of course, be made with any desired number, area, or size of the casing and the ring-shaped plates, positive and negative, and constituting the anode and cathode members of the battery, dependent upon the desired capacity.

Such elements are capable of change and variation within the judgement and control of the builder or designer, and such or any other changes within the province of the skilled mechanic are understood to be within the scope of the appended claims.

What we claim is:—

1. A reversible battery consisting of a cylindrical casing having a middle continuously empty space and adapted to contain a limited quantity of fluid electrolyte for a portion of its depth, a closure for one end of the casing have a series of concentrically arranged inwardly extending cylindrical walls of positive polarity, an alternating series of cylindrical walls of negative polarity spaced between said walls, each series having a common connecting portion, means for fixedly holding them in operative relation for partial or complete immersion in or complete withdrawal from the electrolyte, a gas relief conduit extending through the wall of the casing having an open ended inner terminal located in said middle continuously empty space, and an outer supporting plug mounted in the casing wall and provided with a fluid arresting trap cavity communicating with the gas conduit.

2. A reversible battery consisting of a cylindrical closed bottom casing of carbon or the like having a middle continuously empty space and adapted to contain a limited quantity of fluid electrolyte for a portion of its depth, a closing head of similar material secured at the other end of the casing having a series of concentrically arranged inwardly extending integral cylindrical walls of positive polarity, a similar series of alternating cylindrical metallic walls of negative polarity spaced between said walls and from the head, an inner cross connecting bar for the metallic walls and a holding and conducting stem therefor fixedly mounted in and extending centrally inward of the closing head for holding the metallic negative polarity walls in operative relation to the positive polarity walls of the head during partial or complete immersion in or complete withdrawal from the electrolyte upon tipping the battery, and a gas relief conduit extending through the wall of the casing having an open ended inner terminal located in said middle continuously empty space.

3. A reversible battery consisting of a cylindrical closed bottom casing of carbon or the like having a middle continuously empty space and adapted to contain a limited quantity of fluid electrolyte for a portion of its depth, a closing head of similar material secured at the other end of the casing having a series of concentrically arranged inwardly extending integral cylindrical walls, a similar series of alternating cylindrical metallic walls spaced between said walls and from the head, an inner cross connecting bar for the metallic walls and a holding and conducting stem therefor fixedly mounted in and extending centrally inward of the closing head for holding the metallic walls in operative relation to the walls of the head during partial or complete immersion in or complete withdrawal from the electrolyte upon tipping the battery, a gas relief conduit extending through the wall of the casing having an open ended inner terminal located in said middle continuously empty space, and an outer supporting plug mounted in the casing wall and provided with a fluid arresting trap cavity communicating with the gas conduit.

4. A reversible battery consisting of a cylindrical closed bottom casing of carbon or the like having a middle continuously empty space and adapted to contain a limited quantity of fluid electrolyte for a portion of its depth, a closing head of similar material secured at the other end of the casing having a series of concentrically arranged inwardly extending integral cylindrical walls, a similar series of alternating cylindrical metallic walls spaced between said walls and from the head, an inner cross connecting bar for the metallic walls and a holding and conducting stem therefor fixedly mounted in and extending centrally inward of the closing head for holding the metallic walls in operative relation to the walls of the head during partial or complete immersion in or complete withdrawal from the electrolyte upon tipping the battery, a trap enclosing plug screwed into the side of the casing having an inner cavity and an outer vent opening, and a gas relief conduit communicating with said cavity and extending inwardly of the casing with its terminal located in said middle continuously empty space.

In testimony whereof we affix our signatures.

FREDERICK W. HOCHSTETTER.
WILLIAM BROAD.